United States Patent [19]

Wegemund et al.

[11] 4,048,259
[45] Sept. 13, 1977

[54] ANAEROBICALLY COMPOSITIONS CONTAINING ACRYLIC ESTER-ACIDS

[75] Inventors: Bernd Wegemund, Haan; Joachim Galinke, Langenfeld, both of Germany

[73] Assignee: Henkel & Cie GmbH, Dusseldorf, Germany

[21] Appl. No.: 702,229

[22] Filed: July 2, 1976

[30] Foreign Application Priority Data

July 4, 1975 Germany .............................. 2529891

[51] Int. Cl.² .......................... C08F 4/32; C08F 20/10; C08F 120/68
[52] U.S. Cl. ..................................... 260/881; 156/332; 260/77.5 CR; 260/884; 260/885; 428/463; 526/208; 526/217; 526/230; 526/292; 526/312; 526/318
[58] Field of Search ............... 526/318, 292, 312, 208, 526/230, 217; 260/77.5 CR, 881, 884, 885, 77.5 AN

[56] References Cited

U.S. PATENT DOCUMENTS

| | | | |
|---|---|---|---|
| 3,661,876 | 5/1972 | Wegemund | 260/30.6 |
| 3,770,491 | 11/1973 | Spoor et al. | 526/318 |
| 3,790,533 | 2/1974 | Samour | 526/318 |
| 3,899,382 | 8/1975 | Matsuda et al. | 526/230 |
| 3,957,561 | 5/1976 | Skoultchi | 526/292 |

*Primary Examiner*—Herbert J. Lilling
*Attorney, Agent, or Firm*—Hammond & Littell

[57] ABSTRACT

Anaerobically hardening adhesive compositions principally composed of a polymerizable acrylic ester and an organic aerobically-inactive, anaerobically-active peroxide polymerization catalyst therefor possess improved latent adhesive properties for metals when they contain an acrylic ester-acid of the formula:

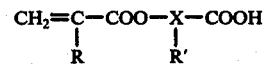

wherein R is —H or —CH₃; R' is H, halogen, —COOH, —CN, and loweralkyl, and X is a divalent C₁₋₆ hydrocarbon group, or a mixture of such ester-acids.

14 Claims, No Drawings

ANAEROBICALLY COMPOSITIONS CONTAINING ACRYLIC ESTER-ACIDS

FIELD OF THE INVENTION

The present invention relates to anaerobically hardening adhesive compositions of improved latent adhesiveness towards metals, particularly steel. The invention includes the compositions themselves as well as metal substrates adhered together by the compositions in anaerobically set state.

BACKGROUND OF THE INVENTION

In recent years the adhesive bonding of metal surfaces has become an important industrial practice in the assembly of articles of intricate shapes, which include jewelry and aircraft fuselage and wind components.

A recent discovery in this field is a group of adhesives which remain fluid or spreadable for useful periods of time when stored with access of oxygen (or air), but which set or "cure" rapidly when allowed to stand in the absence of air (i.e., in the absence of "free" or molecular oxygen). Such compositions are termed "anaerobically setting adhesives". They consist essentially of a liquid or spreadable polymerizable vinyl monomer (or a mixture of such monomers) and an organic peroxide polymerization initiator therefor, which remains inactive or ineffective in the presence of free oxygen but which rapidly initiates polymerization upon exclusion of oxygen, after which the polymerization goes to completion with formation of a strong adhesive bond.

A wide variety of vinyl monomers been found suitable for the purpose; the term "monomers" includes complex acrylic compounds which contain a plurality of vinyl substituents as well as other substituents. In the adhesives field, acrylic compounds are generally regarded as monomeric when they are of fluid or syrupy (paste) viscosity.

Acrylic compounds which are suitable for use in anaerobically setting adhesives in general are the polymerizable esters of two or mols of (meth) acrylic acid with appropriate alcohols, for example tetraethylene glycol diacrylate, tetraethylene glycol di (chloroacrylate), diglyceryl diacrylate, diglycerol tetramethacrylate, neopentyl glycol diacrylate, and trimethylol propane triacrylate.

Suitable esters can also be formed by reacting an acrylate ester containing a reactive hydroxyl or amine group in the non-acrylate portion with an organic disocyanate, and a wide variety of such esters is known. Diisocyanates suitable for the above purpose include toluene diisocyanate, 4,4'-diphenyl diisocyanate, 1,5-naphthalene diisocyanate, and cyclohexylene diisocyanate.

Compositions of the foregoing type are disclosed in Gruber et al. U.S. applications Ser. Nos. 607,463; 607,465; 607,466; and 607,467 now respectively U.S. Pat. Nos. and in U.S. Pat. 2,626,178; 2,895,950; 3,041,322; 3,043,820; 3,046,262; 3,218,305; 3,425,988; 3,625,930; and 3,682,875.

In general, the diacrylic and dimethacrylic esters of dihydroxy alcohols are suitable for use in the manufacture of liquid or paste mixtures which polymerize in the absence of air and which are suitable for adhesive purposes. The di-, tri- and tetraethylene glycols ester are particularly suitable.

Furthermore, the acrylic and methacrylic esters of monohydroxy alcohols such as cyclopentanol, methylcyclopentanol, cyclohexanol, methylcyclohexanol, methylcyclopentane, methylolcyclohexane, borneol, tetrahydrofurfuryl alcohol and 1,3-dioxa-2,2-dimethyl-4-methylol cyclopentane have been used for these purposes.

However, the known adhesives frequently possess certain disadvantages, particularly the disadvantage of unsatisfactory adhesion to metal surfaces. Metal surfaces to be adhered to one another with these adhesives usually have to be subjected to special pretreatment with primers such as isocyanates or the like.

According to U.S. Pat. No. 3,300,547, the adhesiveness of such compositions for steel is enhanced by the action of a polymerizable terminal double bond for ethylene linkage adjacent to a carboxyl substituent. However, carboxyl substituents have a corrosive action towards steel.

OBJECTS OF THE INVENTION

One object of the present invention is to avoid the aforementioned disadvantages and to provide a satisfactory non-corrosive adhesive mixture which is based on (meth) acrylic esters, which hardens in the absence of oxygen, and which results in strong joints without the use of primers when applied to metal (including steel).

Another object of the invention is to provide an anaerobically setting adhesive/sealing composition which does not require the presence of acrylic acid or other noxious acid.

THE INVENTION

The present invention is based on our discovery that the adhesiveness of anaerobically setting adhesives and sealing compounds, in anaerobically set or "cured" state, for steel and other metal surfaces, is substantially improved when the adhesive has a reacted content of a acrylic esteracid of the formula:

| | |
|---|---|
| Tetrahydrofurfuryl methacrylate | 62.3 g. |
| Adduct of 2 mols of hydroxyethyl methacrylate with 1 mol of polyester containing isocyanate end groups* | 26.7 g. |
| Acrylic ester of β-hydroxypropionic acid (B.P. 114°/0.2 mm. Hg) | 5 g. |
| 70% solution of cumene hydroperoxide in cumene | 5 g. |
| Tributylamine | 1 g. |

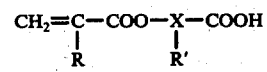

wherein R represents a substituent selected from the group consisting of —H and —CH₃, R' represents H, halogen,—COOH, —CN, and loweralkyl, and —X— represents a hydrocarbon group of 1 to 6 carbon atoms. "Loweralkyl" designates the $C_{1-8}$ alkyl groups, for example methyl, propyl, isopropyl, isoamyl and octyl. —X— can be methylene, amylene, hexylene, phenylene and 1,4-cyclohexylidene.

The principal embodiments of our invention are (1) adhesive and sealing compositions consisting essentially of a polymerizable acrylic ester, an organic peroxide aerobically inactive anaerobically active polymerization initiator therefor, and an effective amount, in the range of 3% to 25% by weight, of said acrylic ester-acid, and (2) assemblies of closely-fitting metal assembly elements adhered together by a composition as described above in anaerobically set state.

Suitable esters of the foregoing type are, for example, the acrylic and methacrylic esters of β-hydroxy propionic acid (hydracrylic acid) hydroxyacetic acid (glycolic acid), and hydroxy-cyano-butyric acid. Such esters can be manufactured by known methods. One such method is to react acryloly or methacryloyl chloride with (hydroxyalkyl) carboxylic acid derivatives (for example esters), an converting the resulting esters to the desired acids by hydrolysis. Alternatively, the alkali metal salts of acrylic and methacrylic acids can be reacted with salts or esters of halogen carboxylic acids and, if required, subsequently selectively hydrolyzed to form the desired esters. An additional process for preparing the acrylic esters of β-hydroxy propionic acid has been described by Sherlin et al. in J. Gen. Chem. (USSR), 8, No. 7 (1938).

Anhydrous acrylic acids have already been used in the formulation of adhesives which provide joints of the high tensile and shear strengths (DIN 53283) required in special instances. However, acrylic acids have considerable disadvantages as raw materials because of their unpleasantly sharp odor, their etching effect, their relatively high volatility, and their corrosiveness to metal surfaces.

The principal components of the adhesives or sealing agents in accordance with the present invention are the (meth) acrylic acid esters of mono- to tri-hydric alcohols. Suitable alcohol components are the di, tri-, and tetra-oxyethylene glycols, glycerol, or alternatively, cyclopentanol, methylcyclopentanol, cyclohexanol, methylcyclohexanol, 1,3-dioxa-2,2-dimethyl-4-methylol-cyclopentane, tetrahydrofurfuryl alcohol, or 4-methylolcyclohexane. Satisfactory results are also obtained with esters produced by reacting (meth) acrylic acid with dimerized cyclopentadiene, i.e., (meth) acrylic acid esters of the isomeric dihydrodicyclopentadienols.

In addition to the above-mentioned (meth) acrylic acid esters, those of saturated polyesters can also be employed. These polyesters (which contain OH groups) are manufactured by condensation of aliphatic and/or aromatic dicarboxylic acids, for example adipic acid, sebacic acid, dimeric fatty acid, phthalic acid, isophthalic acid, and terephthalic acid with an excess of one or more diols, for example ethylene glycol, propylene glycol, butylene glycol, and di- and triethylene glycol. They can be esterified with acrylic acid and/or methacrylic acid in a known manner. The saturated polyesters can also be modified before introducing the (meth) acrylic ester.

For the purpose of modification, the polyester diols, which have a molar weight of approximately 1,800 to 3,000, are reacted with diisocyanates in such proportion that one mol of diisocyanate is allotted to one OH group. Suitable isocyanates are diphenylmethane diisocyanate, toluene diisocyanate, dianisidine diisocyanate, isophorone diisocyanate and the like. The condensate containing isocyanate groups, which is thus obtained, is then reacted with an quantity corresponding to the free isocyanate groups, of a (meth) acrylic ester containing hydroxyl groups. The monoesters of ethylene glycol or other α, ω-alkane-diols having up to approximately 12 carbon atoms are suitable.

Peroxides which are suitable for use in the adhesives in accordance with the present invention are tert.-butyl perbenzoate, di-tert.-butyl diperoxyphthalate, 2,5-dimethyl 2,5-bis-(tert.-butyl peroxy)-hexane, bis-(1-hydroxycyclohexyl)peroxide, tert.-butyl peroxyacetate, 2,5-dimethylhexyl-2,5-(peroxybenzoate), tert.-butyl peroxyisopropylcarbonate, n-butyl-4,4-bis-(tert.-butyl peroxy) valerate, 2,2-bis-(tert.-butyl peroxy)-butane, and di-tert.-butyl peroxide. Organic hydroperoxides are particularly suitable which are derived from hydrocarbons which contain approximately 3 to 18 carbon atoms. By way of example, tert.-butyl hydroperoxide, cumene hydroperoxide, methyl ethyl ketone hydroperoxide, and diisopropylbenzene hydroperoxide, are suitable. The peroxides should be present in effective catalytic quantity in the range of 0.1% to 20%, particularly 0.5% to 10% by weight.

The adhesives may also contain small amounts of auxiliary compounds such as are customarily present in adhesives of this type.

The adhesives may also contain stabilizers and, if desired, accelerators. Suitable stabilizers include for example, polyvalent phenols or quinones such as hydroquinone and di-tert.-butyl hydroquinone. They are typically present to the extent of 0.1% to 5% by weight.

Suitable accelerators include for example aliphatic or aromatic tertiary amines, for example triethylamine, and dimethylaniline, and mercaptans such as octyl mercaptan or dodecyl mercaptan. These inhibit polymerization of the composition during storage. The accelerators are generally present only in small quantities (approximately 0.1% to 5%); these accelerate the polymerizing action of the catalyst.

Furthermore, thickening agents, softeners, and coloring matter can also be present.

Suitable thickening agents are the ester-soluble poly (lower alkyl)acrylates and methacrylates such as polymethyl methacrylate and polyethyl acrylate, and ester-soluble polyvinyl hydrocarbons such as polystyrene. They are generally used in amount sufficient to give the composition a pastelike viscosity.

Inorganic fillers and colorants can be present, for example, finely divided silicic acid, calcium silicate, bentonites, calcium carbonate, and titanium dioxide; and soluble dyes in amounts appropriate for the purpose.

The adhesive compositions of the present invention have excellent storage stability in air or oxygen. Compared with known compositions, they are distinguished by the improved shear strength which they process when applied as adhesives and allowed to set under anaerobic conditions.

The initiators, stabilizers and accelerators within the foregoing description are suitable for use when they are soluble in the ester component.

The compositions of the present invention are suitable for bonding assemblies of metals such as iron, brass, copper, and aluminum to each other. Small quantities of the adhesive compositions mixtures are introduced between the surfaces to be bonded, after which the surfaces are contacted with each other sufficiently firmly or in another manner so as to exclude air or oxygen. A bond is obtained between the said materials after a short period of time (typically approximately 1 to 3 hours); the bond reaches its final strength after approximately 24 to 120 hours. If required, the rate of cure can be accelerated by heating the joint.

When the adhesives of the present invention are to be used for adhering or sealing glass or plastics or metals which are less catalytically active (for example, zinc, cadmium, high-alloyed steels and anodized aluminum), it is advantageous to pretreat these materials with metallic salt accelerators (for example copper naphthenate and cobalt naphthenate).

The adhesive or sealing compositions of the present invention are useful for the cementing of screws and bolts in their threads (to prevent subsequent unloosening), the sealing of screw connections, nipples, etc., the cementing of plug connections, the sealing of flanges, and the assembly of intricate metal shapes.

The invention is now further illustrated by the following examples. These examples are best embodiments of the invention and are not to be construed in limitation thereof.

EXAMPLE 1

A mixture was formed of the following components:

| | |
|---|---|
| Tetrahydrofurfuryl methacrylate | 62.3 g. |
| Adduct of 2 mols of hydroxyethyl methacrylate with 1 mol of polyester containing isocyanate end groups* | 26.7 g. |
| Acrylic ester of β-hydroxypropionic acid (B.P. 114°/0.2 mm. Hg) | 5 g. |
| 70% solution of cumene hydroperoxide in cumene | 5 g. |
| Tributylamine | 1 g. |

Steel plates (100 × 25 × 1.25 mm.) which had been ground with emery paper at the places intended for the adhesive, were adhered to one another by means of this mixture with a single overlap of approximately 10 mm. The lap thus formed was allowed to set for 96 hours at 21° C. The lap then had a tensile and shearing strength of 2.0 kp/mm². (DIN 53283).

EXAMPLE 2

The procedure of Example 1 was repeated, except that the methacrylic ester of β-hydroxy propionic acid was used instead of the acrylic ester. After setting the lap possessed, a tensile and shearing strength of 1.95 kp/mm².

EXAMPLE 3

A mixture was prepared from the following constituents:

| | |
|---|---|
| Tetrahydrofurfuryl methacrylate | 58.8 g. |
| Adduct of Example 1* | 25.2 g. |
| Methacrylic ester of glycolic acid (B.P. 94°/0.2 mm. Hg) | 10 g. |
| 70% solution of cumene hydroperoxide in cumene | 5 g. |
| Tributylamine | 1 g. |

The application and test procedure of Example 1 was repeated. After setting the average tensile and shearing strength of the lap was 2.0 kp/mm².

EXAMPLE 4

A mixture of the following constituents was produced:

| | |
|---|---|
| Dihydrodicyclopentadienyl methacrylate | 44.5 g. |
| Adduct of Example 1* | 44.5 g. |
| Acrylic ester of β-hydroxy propionic acid | 5 g. |
| 70% solution of cumene hydroperoxide in cumene | 5 g. |

| | |
|---|---|
| -continued | |
| Tributylamine | 1 g. |

The plates were heated for 30 minutes at 120° C., their average tensile and shearing strength at 21° C. was 2.5 kg/mm².

COMPARISON TESTS a. The β-acryloyloxypropionic acid of Example 1 was replaced by acrylic acid and the procedure repeated. The tensile and shearing strength of the cured lap was 1.7 kp/mm².

b. The β-acryloyloxypropionic acid of Example 4 was replaced with acrylic acid. After curing the tensile and shearing strength of the lap was 2.35 kp/mm².

The preceeding specific embodiments are illustrative of the practice of the invention. It is to be understood however, that other expedients known to those skilled in the art or disclosed herein may be employed without departing from the spirit of the invention or the scope of the appended claims.

We claim:

1. An anaerobically setting adhesive and sealing composition consisting essentially of a polymerizable acrylic ester of spreadable viscosity, an organic aerobically inactive, anaerobically active peroxide polymerization initiator therefor, and an effective amount as latent agent improving the adhesiveness of said composition for metals when anaerobically set, in the range of 3% to 25% by weight, of an acrylic ester-acid of the formula:

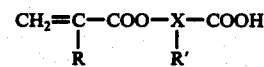

$$CH_2=C-COO-X-COOH$$
$$\phantom{CH_2=}|\phantom{-COO-X-}|$$
$$\phantom{CH_2=C}R\phantom{-COO-X-}R'$$

wherein R represents a substituent selected from the group consisting of —H and —CH₃, R' represents a substituent selected from the group consisting of H, halogen, —COOH, —CN, and loweralkyl, and X represents a divalent $C_{1-6}$ hydrocarbon group.

2. A composition according to claim 1 wherein R represents H.

3. A composition according to claim 2 wherein R' represents H.

4. A composition according to claim 3 wherein —X— represents —(CH₂)₂—.

5. A composition according to claim 1 wherein —X— represents phenylene.

6. A composition according to claim 1 wherein said acrylic ester-acid is the acrylic ester of β-hydroxypropionic acid.

7. A composition according to claim 1 wherein said acrylic ester is the methacrylic ester of β-hydroxypropionic acid.

8. A composition according to claim 1 wherein the acrylic ester-acid is the methacrylic ester of glycolic acid.

9. A composition according to claim 1 wherein said acrylic ester-acid is present in amount between 5% and 15% by weight.

10. A composition according to claim 1 wherein the initiator is cumene hydroperoxide.

11. A composition according to claim 1 containing an effective amount of at least one member of the group consisting of stabilizers, accelerators, thickening agents, inorganic fillers, softening agents and colorants.

12. A composition according to claim 1 containing a small but effective amount in the range of 0.1% to 5% by weight of hydroquinone as stabilizer.

13. A composition according to claim 1 containing a small but effective amount in the range of 0.1% to 5% by weight of tributylamine as accelerator.

14. A composition according to claim 1 containing an effective dissolved amount of polymethyl methacrylate as thickening agent.

* * * * *

UNITED STATES PATENT OFFICE
CERTIFICATE OF CORRECTION

Patent No. 4,048,259  Dated Sept. 13, 1977

Inventor(s) BERND WEGEMUND and JOACHIM GALINKE

It is certified that error appears in the above-identified patent and that said Letters Patent are hereby corrected as shown below:

| Col. | Line | | |
|---|---|---|---|
| 2 | 40-47 | Delet this table | |
| | | "Tetrahydrofurfury methacrylate | 62.3 g |
| | | Adduct of 2 mols of hydroxyethyl methacrylate with 1 mol of polyester containing isocyanate end groups* | 26.7 g |
| | | Acrylic ester of β-hydroxypropionic acid (B.P. 114°/0.2 mm Hg). | 5 g |
| | | 70% solution of cumene hydroperoxide in cumeme | 5 g |
| | | Tributylamine " | 1 g |
| 6 | following Example 4 | Insert --*Made by esterifying approximately 1 mol of an adipic acidphthalic acid mixture with 1 mole of diethylene glycol to a molar weight of 2,000, and reacting the terminal OH groups with 1 mol of diphenyl methane diisocyanate.-- | |

Signed and Sealed this

Twenty-first Day of March 1978

[SEAL]

Attest:

RUTH C. MASON  
Attesting Officer

LUTRELLE F. PARKER  
Acting Commissioner of Patents and Trademarks